(12) United States Patent
Lin et al.

(10) Patent No.: US 7,505,257 B2
(45) Date of Patent: Mar. 17, 2009

(54) BODY STRUCTURE FOR NOTEBOOK TYPE COMPUTER

(75) Inventors: Tien-Chang Lin, Taipei (TW); Xin-Jie Miao, Shanghai (CN)

(73) Assignee: Inventec Corporation, Taipei (TW)

( * ) Notice: Subject to any disclaimer, the term of this patent is extended or adjusted under 35 U.S.C. 154(b) by 701 days.

(21) Appl. No.: 11/094,296

(22) Filed: Mar. 31, 2005

(65) Prior Publication Data

US 2007/0279848 A1 Dec. 6, 2007

(51) Int. Cl.
*G06F 1/16* (2006.01)
*H05K 7/16* (2006.01)

(52) U.S. Cl. .................................. 361/683; 361/726

(58) Field of Classification Search ................ 361/683, 361/679–686, 724–727, 801, 802, 740, 747, 361/759, 760; 174/50, 535, 562, 135
See application file for complete search history.

(56) References Cited

U.S. PATENT DOCUMENTS

| | | | | |
|---|---|---|---|---|
| 5,132,876 A | * | 7/1992 | Ma | 361/680 |
| 5,430,617 A | * | 7/1995 | Hsu | 361/818 |
| 5,455,746 A | * | 10/1995 | Sato et al. | 361/816 |
| 6,262,883 B1 | * | 7/2001 | Kim | 361/680 |

* cited by examiner

*Primary Examiner*—Jayprakash N Gandhi
*Assistant Examiner*—Nidhi Desai
(74) *Attorney, Agent, or Firm*—Muncy, Geissler, Olds & Lowe, PLLC

(57) ABSTRACT

A body structure for a notebook type computer includes a cover, a motherboard, and a base. An electronic device integrated on the motherboard is used to fix a locking member, and the locking member can be interlocked with a locking means formed on a bottom surface of the cover. The arrangement of the locking member and locking means can replace provision of screw members at a central area in the conventional technology and overcome drawbacks caused therefrom.

10 Claims, 3 Drawing Sheets

BODY STRUCTURE FOR NOTEBOOK TYPE COMPUTER

BACKGROUND OF THE INVENTION

1. Field of the Invention

The present invention relates to body structures for computer devices, and more particularly, to a body structure for a notebook type computer.

2. Brief Discussion of the Related Art

Electronic information devices, especially computers, have been in widespread use among all age groups. In a highly competitive era nowadays, the design, manufacture or assembly of computer hardware must be made to reduce costs, so as to improve competitiveness thereof in the market. Thus, any improvement in the computer hardware framework to facilitate structural simplification, easy assembly or reduction in fabrication costs is considered valuable for computer hardware manufacturers.

A body structure for a notebook type computer has been developed toward light weight and low profile, and is usually in the form of modular design. Besides comprising compulsory components such as hard disk, battery and so on, the modular body structure may also be integrated with electronic devices such as modem, network card and so on to satisfy a network application of the notebook type computer.

As shown in FIG. 1, a conventional body structure for notebook type computer 1 comprises a base 11 and a cover 13 correspondingly coupled to each other, wherein a modular motherboard (not shown) is mounted between the base 11 and the cover 13. The motherboard is usually integrated with additional electronic devices such as hard disk, CD-ROM driver, battery, modem, network card and so on. The cover 13 is usually formed with a keyboard opening 131 and a cursor-panel opening 133. Generally, to assemble the body structure 1, a plurality of screw members such as screws are used to penetrate upwardly from the base 11 through the motherboard to be fixed with the cover 13 to thereby tightly couple the cover 13 and the base 11 together and ensure the surface flatness of the cover 13 to prevent any partial protrusion of the cover from damaging a panel such as a liquid crystal display (LCD).

In the conventional body structure for notebook type computer 1, a plurality of screw holes and keyholes corresponding in position to each other must be formed at the base 11 and the cover 13 in order to use the plurality of screw members such as screws to couple the base 11 and the cover 13 together. Normally, the keyholes are formed at a bottom surface of the cover 13 and the screw holes are formed in the base 11 to maintain a nice appearance of a top surface of the cover 13. Since the screw holes and the keyholes correspond in number and location to each other and are both for being interlocked with the screw members, only the cover 13 is exemplified and described as follows.

As shown in FIG. 2, the screw members 15 are usually provided at a peripheral area of the cover 13 and at a central area near the keyboard opening 131 and the cursor-panel opening 133. The screw members 15 located at the peripheral area of the cover 13 usually correspond to a peripheral area free of circuit layout of the motherboard, thereby not affecting the circuit layout of the motherboard. However, the screw members 15 located at the central area of the cover 13 correspond to a predetermined area of circuit layout of the motherboard, such that the circuit layout on the motherboard must be modified to have no interference with the provision of screw members 15 at the central area of the cover 13. This arrangement not only increases difficulty and complexity in designing the circuit layout of the motherboard, thereby reducing flexibility of the circuit layout design of the motherboard, but also enlarges the size of the motherboard, making the body structure 1 hard to be decreased in volume. Furthermore, the more screw members 15 being used, the more inconvenience in assembly/disassembly and maintenance is caused and the more costs of assembly and maintenance are required.

Therefore, the problem to be solved here is to provide a body structure for notebook type computer, which can resolve the aforementioned drawbacks to thereby reduce the number of screw members being used, decrease costs of assembly and maintenance, reduce difficulty and complexity in a circuit layout design of a motherboard, increase flexibility of the circuit layout design of the motherboard, and miniaturize the size of the motherboard and the volume of the body structure.

SUMMARY OF THE INVENTION

In light of the above drawbacks in the conventional technology, an objective of the present invention is to provide a body structure for a notebook type computer, which can reduce the number of screw members being used.

Another objective of the present invention is to provide a body structure for a notebook type computer, which can reduce difficulty and complexity in a circuit layout design of a motherboard.

Still another objective of the present invention is to provide a body structure for a notebook type computer, which can increase flexibility of a circuit layout design of a motherboard.

A further objective of the present invention is to provide a body structure for a notebook type computer, which can miniaturize the size of a motherboard and the volume of the body structure.

A further objective of the present invention is to provide a body structure for a notebook type computer, which can reduce costs of assembly and maintenance.

In accordance with the foregoing and other objectives, the present invention proposes a body structure for a notebook type computer, comprising: a base for receiving a motherboard having at least an electronic device and being peripherally formed with a plurality of first coupling portions; at least a locking member fixed with the electronic device to the motherboard; and a cover being peripherally formed with a plurality of second coupling portions corresponding in position to the first coupling portions, allowing the cover to be securely attached to the base by coupling the first coupling portions to the second coupling portions, wherein the cover is further provided with at least a locking means corresponding in position to the locking member, for being interlocked with the locking member so as to retain the cover in place with respect to the motherboard, to thereby prevent the cover from protruding from the motherboard.

The locking member is formed with a screw hole for a screw to penetrate therethrough to fix the electronic device to the motherboard. The locking member is preferably a plate made of metallic material. The locking member can be integrated to the electronic device such as a network card or a modem.

The locking means is provided at a central area of a bottom surface of the cover. The locking means can be a protruding portion formed on the bottom surface of the cover, or a groove formed on the bottom surface of the cover. Preferably, the cover comprises a keyboard opening and a cursor-panel opening, and the locking means is located between the keyboard opening and the cursor-panel opening.

The first coupling portions of the base comprise a plurality of screw holes, and the second coupling portion of the cover comprise a plurality of keyholes, such that screw members such as screws can penetrate the screw holes of the base to be fixed to the corresponding keyholes of the cover.

The foregoing body structure for a notebook type computer in the present invention allows an electronic device integrated on a motherboard to fix a locking member, and allows the locking member to be interlocked with a locking means formed on a bottom surface of a cover of the body structure. By such arrangement of the locking means and the locking member, the surface flatness of the cover can be ensured to prevent any partial protrusion of the cover, for example, at a central area thereof, from damaging a panel such as a liquid crystal display (LCD), such that provision of screw members at a central area in the conventional technology is avoided and drawbacks caused thereby can be overcome, thereby reducing the number of screw members being used in the present invention. Compared to the conventional technology, the number of screw members being used is reduced in the present invention. Costs of assembly and maintenance are therefore decreased, difficulty and complexity in a circuit layout design of the motherboard are reduced, flexibility of the circuit layout design of the motherboard is improved, and the size of the motherboard and the volume of the body structure are miniaturized. Therefore, the present invention is capable of overcoming various drawbacks caused by the conventional technology and improving the industrial practicability thereof.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the following detailed description and the accompanying drawings, which are given by way of illustration only, and thus are not limitative of the present invention, and wherein.

DETAILED DESCRIPTION OF THE PREFERRED EMBODIMENTS

Preferred embodiments of a body structure for a notebook type computer proposed in the present invention are described in detail as follows with reference to FIGS. 3 to 6.

Figure 1:
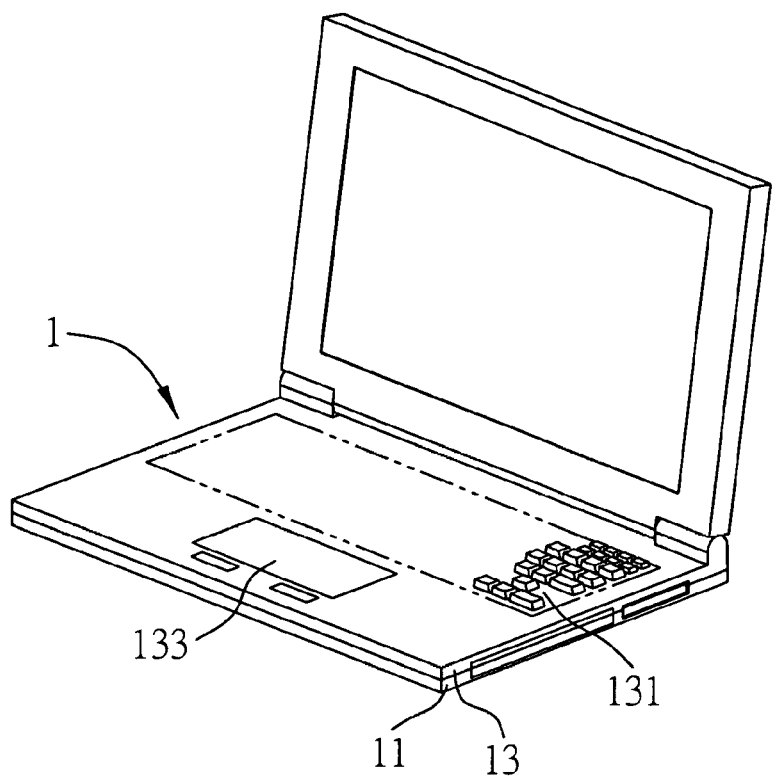
FIG. 1 (PRIOR ART) is a perspective view of a conventional body structure for a notebook type computer.
Figure 2:
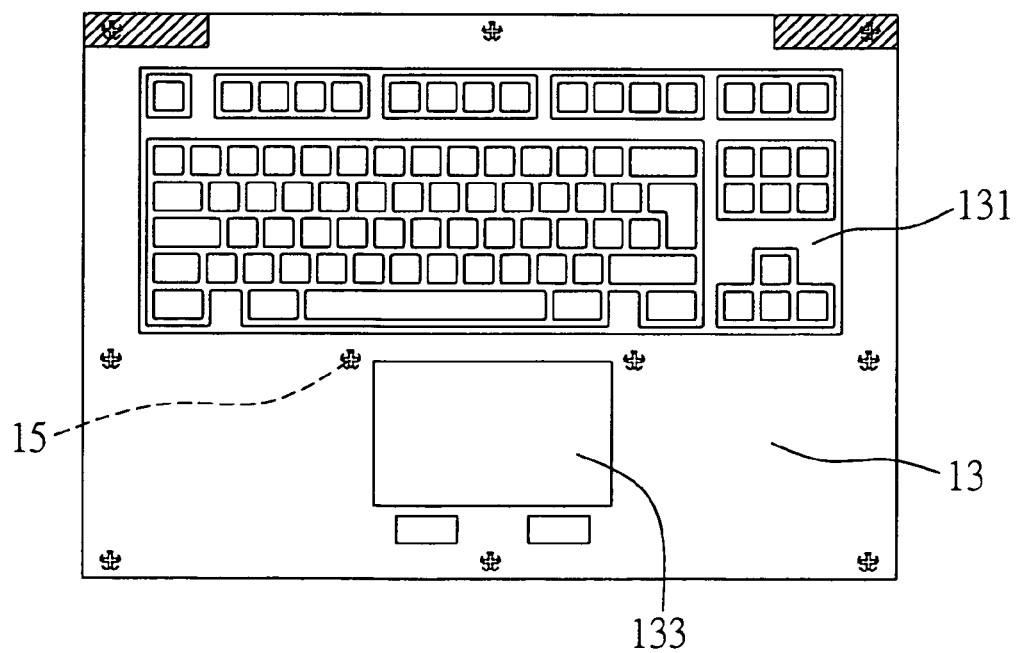
FIG. 2 (PRIOR ART) is a schematic diagram of a layout of screw members in the conventional body structure for a notebook type computer.
Figure 3:
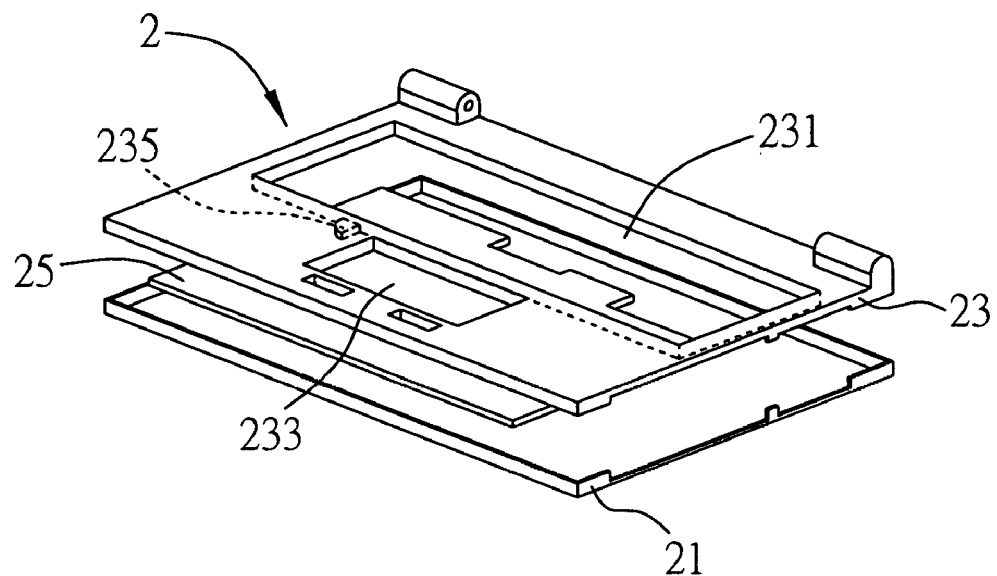
FIG. 3 is a structural exploded view of a body structure for a notebook type computer according to the present invention.
Figure 4:
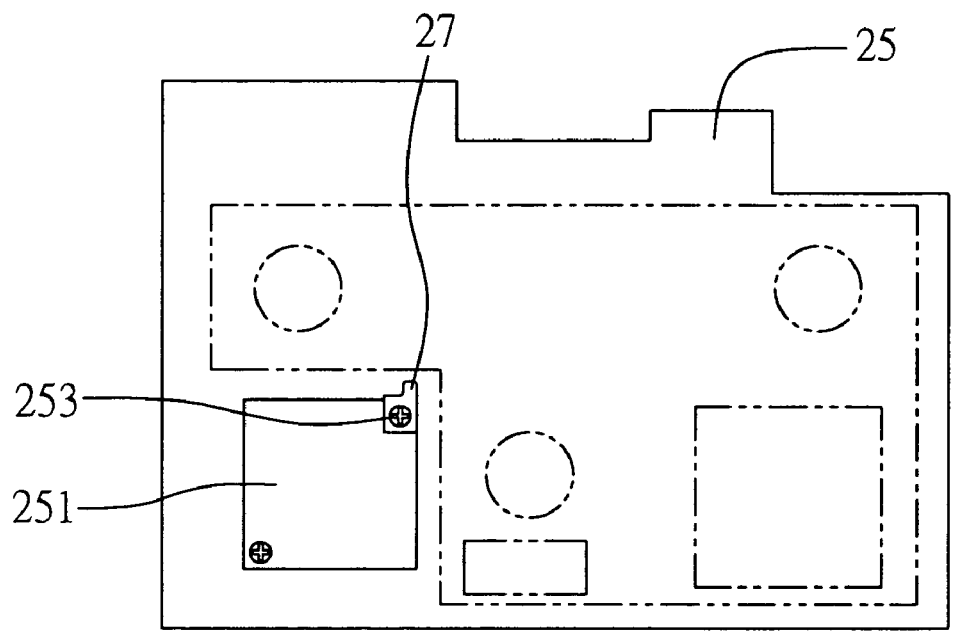
FIG. 4 is a schematic diagram of an example of a motherboard in the body structure for a notebook type computer according to the present invention.

As shown in FIGS. 3 and 4, the body structure for a notebook type computer 2 according to the present invention comprises a base 21 and a cover 23 that can be correspondingly coupled to each other, wherein a modular motherboard 25 is mounted between the base 21 and the cover 23. The motherboard 25 is usually integrated with at least an additional electronic device 251 such as a hard disk, CD-ROM driver, battery, modem, network card and so on, wherein a locking member 27 is provided on the electronic device 251. The cover 23 usually comprises a keyboard opening 231, a cursor-panel opening 233, and at least a locking means 235 formed on a bottom surface of the cover 23. Since the technical features of the present invention are not shown by the appearance of a notebook type computer, and the appearance of assembled body structure 2 is not different from that of the conventional technology, the description and drawings for the appearance of an assembled notebook type computer would not be provided herein for the sake of giving a clear and concise specification.

The base 21 is used to receive the motherboard 25 having the electronic device 251, and is peripherally formed with a plurality of first coupling portions such as screw holes. The cover 23 is provided above and covers the motherboard 25, and is peripherally formed with a plurality of second coupling portions such as keyholes. A corresponding number of screw members can be used to penetrate the first coupling portions to be fixed with the corresponding second coupling portions such that the cover 23 is securely attached to the base 21. Since the first coupling portions such as screw holes formed peripherally at the base 21 and the second coupling portions such as keyholes formed peripherally at the cover 23 correspond in number and location to each other, which are not different from the conventional technology and are not the technical features of the present invention, no drawings thereof are provided in this embodiment.

To ensure the surface flatness of the cover 23 to prevent any partial deformation/protrusion of the cover 23 (especially at an area near the keyboard opening 231) from damaging a panel such as LCD, the locking means 235 and the locking member 27 are provided in the body structure 2 according to the present invention. In this embodiment, the locking means 235 is located at a central area of the cover 23 and substantially between the keyboard opening 231 and the cursor-panel opening 233. The locking means 235 is a protruding portion such as a protruding plate formed on the bottom surface of the cover 23, and can be interlocked with the locking member 27. It should be understood that, apart from the protruding portion, the locking means 235 can be any other structure formed on the bottom surface of the cover 23 and capable of being interlocked with the locking member 27 in the present invention. For instance, the locking means 235 may be alternatively formed as a groove on the bottom surface of the cover 23, such that the locking means 235 is not limited to the protruding portion.

Figure 5:
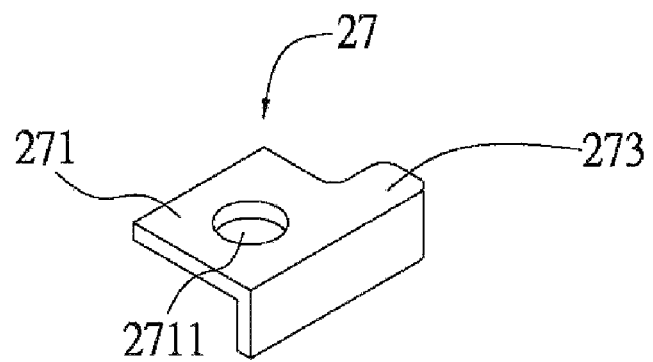
FIG. 5 is a perspective view of a locking member in the body structure for a notebook type computer according to the present invention.

The locking member 27 is provided on the electronic device 251 at a location corresponding to the central area of the cover 23 and substantially between the keyboard opening 231 and the cursor-panel opening 233. The locking member 27 is fixed with the electronic device 251 to the motherboard 25 by a screw 253. The screw 253 is inherently used to fix the electronic device 251 to the motherboard 25, and now in the present invention this screw 253 is further used to fix the locking member 27 and the electronic device 215 to the motherboard 25, such that there is no extra fixing process or screw member being added for the motherboard 25. As shown in FIG. 5, the locking member 27 may be made of a stamping-formed metallic plate, which has an attaching portion 271 and an opposing locking portion 273, wherein the attaching portion 271 has a screw hole 2711 for the screw 253 to penetrate therethrough to attach the locking member 27 to the electronic device 251, and the locking portion 273 can be interlocked with the locking means 235.

It should be understood that apart from the metallic plate, the locking member 27 can be made of any non-metallic plate or slice capable of being interlocked with the locking means 235, such that the locking member 27 is not limited to the foregoing metallic plate. Further, apart from having the screw hole 2711, the attaching portion 271 of the locking member 27 can be formed with any other structure capable of accommodating the screw 253, for example a groove formed on a side of the attaching portion, such that the attaching portion 271 is not limited to one having the screw hole 2711. Moreover, as the locking member 27 is used for being interlocked with the locking means 235, the locking member 27 can be alternatively integrated to the electronic device 251, or even the locking portion 273 of the locking member 27 may be formed during fabrication of the electronic device 251, such that the locking member 27 is not limited to the aforementioned structure or the structure fixed by the screw 253. In addition, the electronic device 251 formed on the motherboard 25 and corresponding to the central area of the cover 23 is usually for example a network card or a modem.

Since the first coupling portions such as screw holes formed peripherally at the base 21 and the second coupling portions such as keyholes formed peripherally at the cover 23 correspond in number and location to each other and are both for being interlocked with the screw members, only the cover 23 is exemplified and described below.

Figure 6:
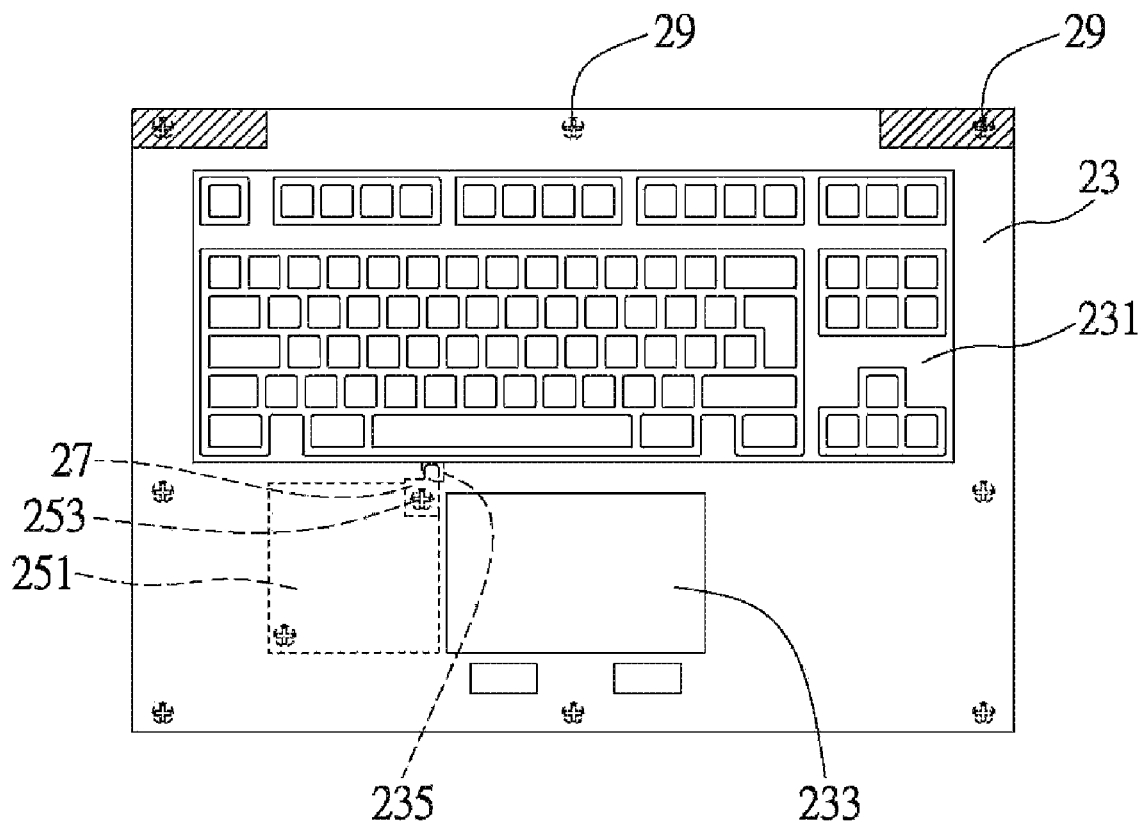
FIG. 6 is a schematic diagram of a layout of the locking member and screw members in the body structure for a notebook type computer according to the present invention.

As shown in FIG. 6, as the surface flatness of the central area of the cover 23 can be achieved by interlocking the locking member 27 with the locking means 235, the screw members 29 are only provided at a peripheral area of the cover 23 in this embodiment. Since the peripheral area where the screw members 29 are located corresponds to a peripheral area free of circuit layout of the motherboard 25, the provision of screw members 29 does not affect the circuit layout of the motherboard 25. Further, the locking member 27 is fixed to the motherboard 25 by the screw 253 that is inherently used for fixing the electronic device 251, the provision of locking member 27 does not affect the circuit layout of the motherboard 25 and thereby can overcome drawbacks caused by disposing screw members at a central area in the conventional technology. Compared to the conventional technology, the present invention can advantageously reduce the number of screw members being used, and also reduce difficulty and complexity in the circuit layout design of the motherboard, improve flexibility of the circuit layout design of the motherboard, and miniaturize the size of the motherboard and the volume of the body structure. Moreover, due to the reduction in screw members being used, convenience in assembly/disassembly and maintenance is improved and costs of assembly and maintenance are accordingly reduced in the present invention.

The body structure for a notebook type computer proposed in the present invention allows an electronic device integrated on a motherboard to fix a locking member, and allows the locking member to be interlocked with a locking means formed on a bottom surface of a cover of the body structure. By such arrangement of the locking means and the locking member, the surface flatness of the cover can be ensured to prevent any partial protrusion of the cover for example at a central area thereof from damaging a panel such as LCD, such that provision of screw members at a central area in the conventional technology is avoided and drawbacks caused thereby can be overcome, thereby reducing the number of screw members being used in the present invention. Compared to the conventional technology, as the number of screw members being used is reduced in the present invention, accordingly costs of assembly and maintenance are decreased, difficulty and complexity in a circuit layout design of the motherboard are reduced, flexibility of the circuit layout design of the motherboard is improved, and the size of the motherboard and the volume of the body structure are miniaturized. Therefore, in the use of the body structure for a notebook type computer according to the present invention, various drawbacks caused by the conventional technology can be overcome, and the foregoing substantive effects highly improve the industrial practicability of the present invention.

The invention has been described using exemplary preferred embodiments. However, it is to be understood that the scope of the invention is not limited to the disclosed embodiments. On the contrary, it is intended to cover various modifications and similar arrangement. The scope of the claims therefore should be accorded the broadest interpretation so as to encompass all such modifications and similar arrangements.

What is claimed is:

1. A body structure for notebook type computer, comprising:
    a base for receiving a motherboard having at least an electronic device, and being peripherally formed with a plurality of first coupling portions;
    at least a locking member fixed with the electronic device to the motherboard, wherein the locking member is formed with a screw hole for a screw to penetrate therethrough, so as to fix the locking member with the electronic device to the motherboard; and
    a cover being peripherally formed with a plurality of second coupling portions corresponding in position to the first coupling portions, allowing the cover to be securely attached to the base by coupling the first coupling portions to the second coupling portions, wherein the cover is further provided with at least a locking means corresponding in position to the locking member, for being interlocked with the locking member so as to retain the cover in place with respect to the motherboard, to thereby prevent the cover from protruding from the motherboard.

2. The body structure of claim 1, wherein the coupling of the first coupling portions to the second coupling portions is completed by the use of a plurality of screws.

3. The body structure of claim 1, wherein the locking member has an attaching portion for attachment to the electronic device and an opposing locking portion for being interlocked with the locking means provided on the cover.

4. The body structure of claim 3, wherein the locking member is made of metallic material.

5. The body structure of claim 1, wherein the locking means is a protruding portion formed on a bottom surface of the cover.

6. The body structure of claim 1, wherein the locking means is formed as a groove on a bottom surface of the cover.

7. The body structure of claim 1, wherein the locking means is formed at a central area of a bottom surface of the cover.

8. The body structure of claim 1, wherein the cover comprises a keyboard opening and a cursor-panel opening, such that the locking means is formed between the keyboard opening and the cursor-panel opening.

9. The body structure of claim 1, wherein the electronic device is a network card.

10. The body structure of claim 1, wherein the electronic device is a modem.

* * * * *